Jan. 14, 1941.                F. M. ARCHIBALD ET AL                2,228,431
                            METHOD OF PURIFYING GLYCOLS
                                  Filed Jan. 3, 1938
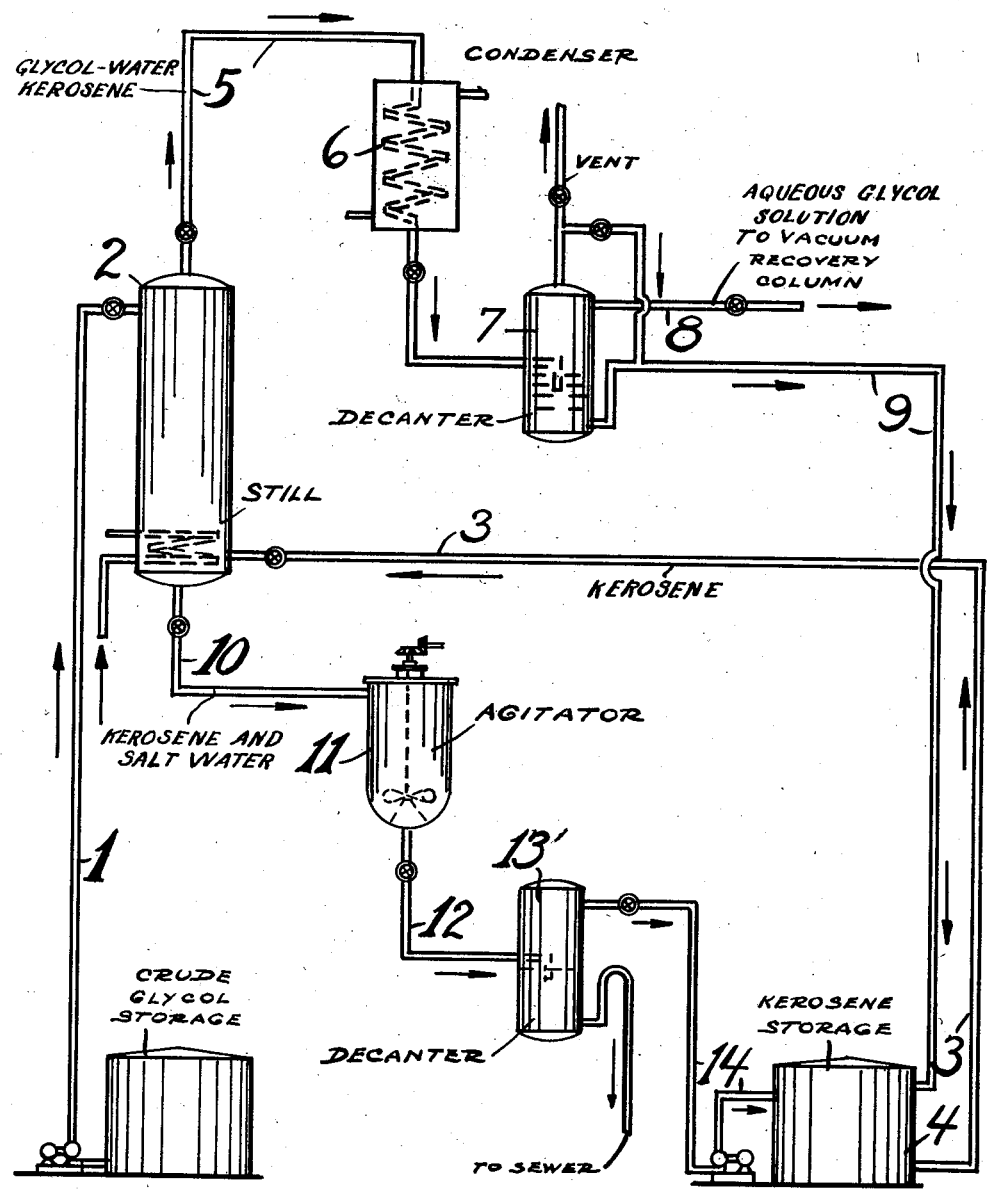
Francis M. Archibald
Charles H. Cohen   Inventors
By P. L. Young    Attorney Patented Jan. 14, 1941

2,228,431

UNITED STATES PATENT OFFICE 2,228,431

METHOD OF PURIFYING GLYCOLS

Francis M. Archibald and Charles A. Cohen, Elizabeth, N. J., assignors to Standard Alcohol Company Application January 3, 1938, Serial No. 183,129

6 Claims. (Cl. 202—56)

This invention relates to a method for recovering organic materials, which are under ordinary conditions of temperature and pressure appreciably soluble in water and immiscible in saturated hydrocarbons, from the byproducts produced during the reaction resulting in the formation of the organic material.

The invention is particularly directed to the recovery of glycols and their derivatives, such as ethers, esters and amines, which are formed along with certain quantities of salts and water by reactions well known in the art. The step of obtaining glycols or derivatives thereof from their crude solutions has given rise to serious problems of manipulation.

Heretofore, using a crude 50% glycol solution as a typical example, the glycol was concentrated to approximately 85–90% in an evaporator. This resulted in the precipitation of sodium sulfate carried in solution up to this point. The precipitated salts would then form an incrustation on the heating surface which would seriously interfere with the heat transfer and speed of distillation. In order to prevent fouling of the heating surface, the solution was circulated at a rapid rate. Salt strainers were provided to remove the salt as it precipitated. The strainers were placed at the discharge end of the evaporator circulation pump. The salt accumulating in the strainers was centrifuged until dry to recover any entrained glycol. A ½–1 water reflux was carried on the evaporator column to prevent loss of glycol in the overhead. In this manner there was produced a 90% glycol solution substantially entirely free from dissolved salt. The 90% glycol solution was then run into a vacuum tower designed to operate at a 50 m. m. absolute pressure at the top of the column where a 99% glycol was taken as a side stream from one of the plates provided for that purpose. The bottoms from the vacuum tower, consisting of higher glycols, and the remainder of the salt were discarded.

We have now found that organic materials, such as glycols, may be separated without hindrance from precipitation of the salts if prior to distillation there is added to the crude solution a volatile organic substance capable of resisting thermal decomposition and is liquid at the temperatures existing in the still. As typical examples of such organic substances there are saturated hydrocarbons such as kerosene, ring compounds such as naphthalene and halogenated hydrocarbons such as halowax. The organic substance used should preferably have a boiling point only slightly higher than the boiling point of the glycol and a specific gravity less than that of the precipitated salt. The saturated hydrocarbon may also contain an anti-oxidant of the condensed nuclear type or preferably an amino or hydroxy substituted product thereof such as naphthol.

The principal object of this invention is to recover by distillation aliphatic poly-oxygenated compounds from solutions of salt and water in which they are dissolved while at the same time preventing the salt from crystallizing and settling out in a hard adherent mass thereby lessening the equipment and handling costs heretofore encountered in the recovery of such aliphatic poly-oxygenated compounds.

Other objects and advantages will be readily apparent to one skilled in the art upon reading our specification.

Broadly, our method, which may be applied either in a batch or continuous process, embraces the steps of mixing crude saline solutions of aliphatic polyhydroxy compounds with a salt suspending medium, distilling the mixture, recovering as condensate the aliphatic poly-oxygenated compounds and small amounts of a salt suspending medium, allowing the condensate to stratify and decanting the poly-oxygenated compounds, returning the suspending medium to the still. The still bottoms which comprises suspension of salt are removed from a still, the salt washed out and the suspension medium returned to the still.

The accompanying drawing, Fig. 1, illustrates an arrangement of apparatus which may be used in carrying out the present invention. Crude glycol solution enters still 2 through pipe 1 where it is distilled by means of steam or other appropriate heating means. Kerosene or other suspending medium enters the still through pipe 3 from storage tank 4. Vapors consisting of glycol, water and small amounts of suspending medium are carried through pipe 5 to condenser 6 and thence to decanter 7. From the decanter an aqueous solution of glycol is removed through pipe 8 to a vacuum still. Condensed suspending medium is removed from the decanter through pipe 9 to storage 4. Suspending medium carrying suspended salt is removed from the bottom of the still through line 10 to agitator 11 where it is water washed and removed through pipe 12 to decanter 13. In decanter 13 the salt water and suspending medium forms separate layers, the suspending medium being returned through line 14 to storage and the salt water discarded.

A typical example of our invention is the preparation of ethylene glycol from ethylene oxides. The oxide is hydrolized by absorbing in dilute sulfuric acid. This gives a glycol solution in acid which is neutralized with caustic soda and the water is partially distilled off leaving a residue consisting of about 80% glycol, 5% or less of sodium salts and approximately 15% water. Kerosene of 400–500° F. Engler boiling range is added in an amount slightly in excess of that required to suspend the quantity of salt present and the distillation is continued. The overhead consists of a mixture of glycol and kerosene which after condensation easily separates into layers. The kerosene which forms the upper layer may be removed by decantation and returned to the still. The glycol is then conveyed to a vacuum still where it is redistilled in vacuo, a ½–1 reflux is maintained on the still to prevent the loss of glycol. The still bottoms consisting of kerosene and sodium sulfate are removed from the still, washed free of the salt and the kerosene recycled.

It is not intended that this invention be limited in any respect by the example which is given herein only for the sake of illustration.

We claim:

1. A method of recovering aliphatic poly-oxygenated compounds from their saline solution which comprises mixing nine parts of the crude saline solution with at least one part of a stripping medium consisting of a volatile hydrocarbon substance having an initial boiling point not more than 15° F. above the boiling point of the aliphatic poly-oxygenated compound and capable of resisting thermal decomposition, distilling the mixture until the volume of the condensed distillate equals the volume of the saline solution originally used, removing the still bottoms and washing the suspended salt therefrom.

2. A method of recovering aliphatic poly-oxygenated compounds from their saline solution which comprises mixing the saline solution with a volatile hydrocarbon substance containing an anti-oxidant of the condensed nuclear type and having an initial boiling point not more than 15° F. above the boiling point of the poly-oxygenated compound, capable of resisting thermal decomposition and capable of preventing the precipitated salt from assuming a solid cake state, distilling the mixture until the volume of the condensed distillate equals the volume of the saline solution originally used, removing the still bottoms and washing the suspended salt therefrom.

3. A method for obtaining aliphatic poly-hydric alcohols from liquids containing poly-hydric alcohols, salt and water, which consists in placing a saturated hydrocarbon having an initial boiling point not more than 15° F. above the boiling point of the poly-hydric alcohol in quantity sufficient to keep salt in suspension after substantially all of the alcohol has been removed and a liquid consisting of approximately 80% aliphatic poly-hydric alcohol, approximately 5% inorganic salt and approximately 15% water in a still; distilling off the alcohol and water and condensing the vapors, removing from the still the still bottoms.

4. A method for obtaining aliphatic poly-hydric alcohols from their saline solution, which consists in mixing naphthalene with the alcoholic saline solution in an amount sufficient to keep salt in suspension after substantially all of the alcohol has been separated, placing the mixture in a still, distilling off the alcohol and condensing the vapors, removing from the still the still bottoms which consist of salt suspended in the naphthalene, washing out the salt and returning the naphthalene to the still.

5. A method for obtaining aliphatic poly-hydric alcohols from their saline solution which consists in mixing a chlorinated saturated hydrocarbon with the alcoholic saline solution in an amount sufficient to keep salt in suspension after substantially all of the alcohol has been separated, distilling off the alcohol, condensing the vapors containing steam separately from those vapors being predominantly alcohol, removing from the still the still bottoms which consist of salt suspended in the chlorinated saturated hydrocarbon, washing out the salt and returning the chlorinated hydrocarbon to the still.

6. A method for obtaining ethylene glycol from solutions of ethylene glycol, salt and water, which consists in placing water white kerosene boiling approximately between 400–500° F. Engler and a solution consisting of more than 50% ethylene glycol, less than 15% sodium sulfate and the balance water in equal volumes in a still; subjecting the mixture of kerosene and ethylene glycol to a distillation and condensation of the vapors until the volume of the condensate equals the volume of the original glycol salt solution mixture, permitting the glycol and kerosene to stratify, decanting off the kerosene and returning it to the still; separately removing the still bottoms, washing out the suspended salt and returning the kerosene to the still.

FRANCIS M. ARCHIBALD.
CHARLES A. COHEN.